March 10, 1970     R. W. SARGENT     3,500,146
LINEAR DISPLACEMENT TRANSDUCER
Filed Oct. 18, 1967
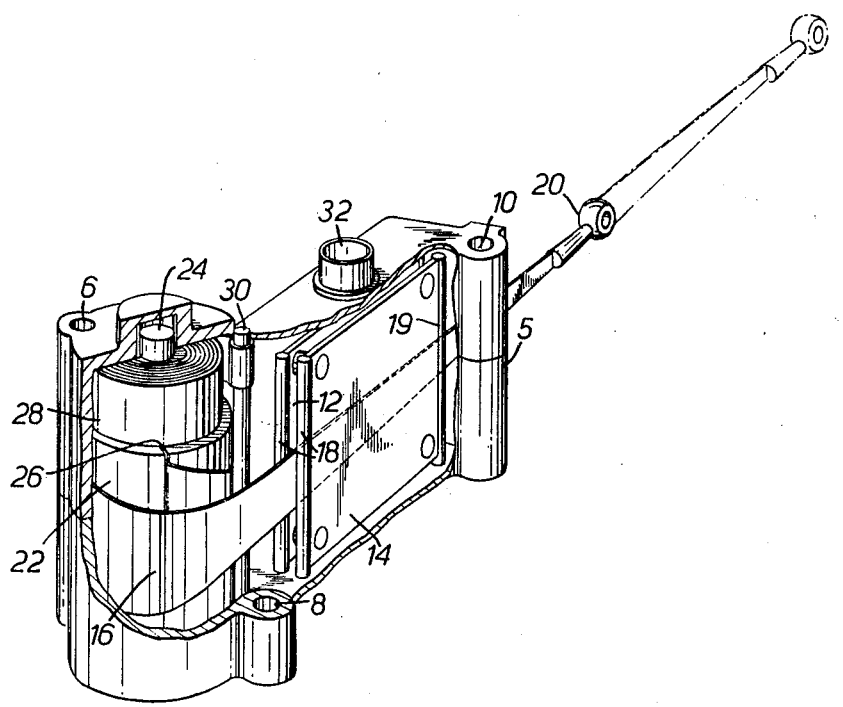
INVENTOR
RAYMOND W. SARGENT.
BY
ATTORNEY United States Patent Office 3,500,146
Patented Mar. 10, 1970

3,500,146
LINEAR DISPLACEMENT TRANSDUCER
Raymond W. Sargent, Bristol, Vt., assignor to Simmonds Precision Products, Inc., Tarrytown, N.Y., a corporation of New York
Filed Oct. 18, 1967, Ser. No. 676,227
Int. Cl. H01g 7/00, 5/00
U.S. Cl. 317—246                                     9 Claims

ABSTRACT OF THE DISCLOSURE

A displacement transducer comprises a pair of capacitor plates between which a tape, of progressively increasing width, is drawn in dependence on the displacement whereby to alter the effective capacitance between the plates in dependence on the displacement.

---

The invention relates to transducers for producing electrical signals in response to displacement.

An object of the invention is to provide an improved transducer operative to produce an electrical output signal dependent on displacement.

Another object of the invention is to provide such a transducer in which the electrical output signal is linearly proportional to the displacement.

A further object of the invention is to provide such a transducer having infinite resolution.

A particular example of a displacement transducer embodying the invention comprises a pair of capacitor plates between which a tape is arranged to be drawn in dependence on the displacement, the tape having a dimension which varies along its length whereby to alter the effective capacitance between the plates as it is drawn therebetween so that the capacitance varies in dependence on the displacement.

A displacement transducer embodying the invention will now be described by way of example and with reference to the accompanying drawing which shows a perspective view of the transducer, the housing thereof being partially broken away to reveal the inside thereof.

The transducer has an electrically conductive housing 5 which may be formed in two halves arranged to be clamped together by bolts (not shown) passing through holes 6, 8 and 10.

The transducer includes a pair of electrically conductive capacitor plates 12 and 14 which are rigidly mounted within and supported by the housing 5. The capacitor plates are electrically insulated from the housing 5 and from each other, and are spaced apart by a predetermined distance between which a flexible metal tape 16 is positioned. The tape 16 passes between and engages a pair of rods 18 mounted at one end of the capacitor plates 12 and 14, and a pair of similar rods (only one, 19, visible) mounted at the opposite end of the capacitor plates. The two pairs of rods prevent the tape 16 from contacting the capacitor plates.

The free end of the tape 16 is provided with a ball-type clevis 20 by means of which the tape may be connected to a member whose displacement is to be sensed and measured.

The width of the tape progressively increases from the free end thereof towards the other end and is wound round a drum 22. The drum 22 is electrically conductive and is supported (as by an internal spider, not shown) on an axle 24 freely rotatably mounted in the housing 5. The drum 22 has a peripheral slot 26 within which the wide end of the tape 16 is securely clamped in electrically conductive relationship. A clock-type spiral spring 28 is mounted within the drum 22 and has one end attached to the axle 24 by means not shown and the other end to a fixed electrically conductive pin 30.

The spring 28 is electrically conductive and thus maintains the tape 16 at ground potential when the housing 5 is grounded. Electrical connections to the capacitor plates 12 and 14 are brought out through a plug assembly 32.

In operation, the clevis 20 is mechanically connected to the member whose displacement is to be sensed and measured. In response to such displacement, the tape 16 is drawn through the space between the capacitor plates 12 and 14, rotating the drum 22 in an anti-clockwise direction (as viewed from above) and thus tensioning the spring 28. The grounded tape acts as a ground plane introduced into the field between the capacitor plates 12 and 14, the effect of this ground plane increasing, as the tape is drawn off the drum in response to displacement, because of the tape's increasing width. Therefore, the effective capacitance between the capacitor plates 12 and 14 is progressively reduced as the tape is pulled outwards so as to produce an electrical signal changing in a particular direction and by an amount dependent on the displacement. When the member whose displacement is being measured moves in the opposite direction, the tape 16 is drawn back on to the drum 22 by virtue of the tension in the spring 28 and the capacitance between the plates 12 and 14 is progressively increased resulting in a change of the electrical signal in the opposite direction. By appropriately arranging the variation of the width of the tape, with respect to its length, the tape displacement and the electrical output signal can be related linearly or in any other desired manner.

If the case 5 is made of electrically insulating material, then the spring 28 can be maintained at ground potential by means of an electrical connection brought out via the plug 32.

The trasducer described is suitable for operation at elevated temperatures, and has infinite resolution.

In a modification, the tapered tape 16 is, instead of being metallic and maintained at ground potential, made of dielectric material. Therefore, as the tape moves through the gap between the plates 12 and 14, in response to displacement, the dielectric constant effective between the plates alters and again produces a varying electrical output signal.

Although there has been described what is considered to be a preferred embodiment of the invention, it will be evident that many changes and modifications may be made without departing from the essential spirit of the invention. It is intended, therefore, in the annexed claims to cover all such changes and modifications as fall within the scope of the invention.

I claim:
1. A displacement transducer, comprising
   a housing,
   a pair of capacitor plates mounted in spaced relationship in the housing and electrically insulated from each other, and
   an elongated flexible tape member supported in the housing for lengthwise movement through the space between the said plates in response to said displacement, the transverse width of said tape member being less than the surface area defined by said plates, and said tape member having its transverse width dimensions varying along the length of the tape member whereby to alter the effective capacitance between the said plates as the tape member moves through said space.

2. A transducer according to claim 1, in which the said control member is maintained at ground potential, and including supporting means mounted on the said base for preventing electrical contact between the control member and the said plates.

3. A transducer according to claim 1, in which the control member is a member of dielectric material.

4. A transducer according to claim 1, including a drum member mounted for rotation on the said base and arranged to receive the said tape.

5. A transducer according to claim 1, including
a drum rotatably mounted on the said base,
means on the said drum for positively retaining one end of said flexible tape, the tape between the said one end and the other end thereof passing through the said space between the plates, and
spring means acting between the said drum and the said base for opposing unwinding of the tape from the drum in response to a displacement force applied to the other end of said flexible tape and thereby tending to re-wind the flexible tape onto the drum.

6. A displacement transducer, comprising
a housing,
a pair of capacitor plates mounted in said housing in spaced relationship and electrically insulated from each other,
means on said housing providing respective electrical connections to each of said capacitor plates,
a drum rotatably mounted in said housing, and a flexible tape at least partially wound on said drum and having one end positively attached to the said drum, the tape passing through the space between the said capacitor plates and its other end protruding externally of said housing, the tape having a dimension which progressively varies along the length of the tape whereby to alter the effective capacitance between the said plates as the flexible tape moves lengthwise in response to displacement.

7. A transducer according to claim 6, including a spiral spring connected between the said housing and the said drum for providing a biasing torque opposing rotation of the drum in the tape-unwinding direction.

8. A transducer according to claim 6, in which the said flexible tape is metallic and has a width dimension which progressively increases along its length, the transducer including means connecting the tape to ground potential, and supporting means preventing the tape from electrically contacting the said plates, the width/length relationship of the tape being such that the change of capacitance between the said plates as the tape moves longitudinally produces an electrical signal which is linearly proportional to displacement of the tape.

9. A transducer according to claim 8, in which the said supporting means comprises two pairs of electrically insulated rods supported in the said housing at opposite ends of the said plates, the said tape passing between and engaging the two rods of each said pair.

References Cited

UNITED STATES PATENTS

| | | | |
|---|---|---|---|
| 1,569,003 | 1/1926 | Curtis | 317—249 |
| 2,478,120 | 8/1949 | Montcalm | 317—249 |
| 2,806,204 | 9/1957 | Rothacker | 317—249 X |
| 3,007,093 | 10/1961 | Potter | 317—249 |
| 3,009,101 | 11/1961 | Locher | 317—246 X |

E. A. GOLDBERG, Primary Examiner

U.S. Cl. X.R.

317—249